US006623660B1

(12) United States Patent
Kimura

(10) Patent No.: US 6,623,660 B1
(45) Date of Patent: Sep. 23, 2003

(54) DECORATED KEY TOP AND MANUFACTURING METHOD THEREOF

(75) Inventor: Toru Kimura, Tokyo (JP)

(73) Assignee: Polymatech Co., Ltd. (JP)

( * ) Notice: Subject to any disclaimer, the term of this patent is extended or adjusted under 35 U.S.C. 154(b) by 177 days.

(21) Appl. No.: 09/631,435

(22) Filed: Aug. 2, 2000

(30) Foreign Application Priority Data

Aug. 30, 1999 (JP) .......................................... 11-244133

(51) Int. Cl.$^{7}$ ............................................... C09K 19/52

(52) U.S. Cl. ................... 252/299.01; 428/145; 200/308

(58) Field of Search ......................... 428/1.1, 195, 215; 252/299.01, 299.7, 299.68, 299.6, 299.61, 299.62, 299.63, 299.64, 299.65, 299.66, 299.67; 200/308

(56) References Cited

U.S. PATENT DOCUMENTS 4,196,976 A * 4/1980 Hoffman, III ............... 350/351
4,198,920 A * 4/1980 Russell ................... 116/114 V
4,301,023 A * 11/1981 Schuberth et al. ....... 252/299.7
4,352,959 A * 10/1982 Warnecke et al. ........ 179/90 K
4,502,048 A * 2/1985 Rehm ......................... 340/365
4,551,717 A * 11/1985 Dreher ....................... 340/712
5,198,148 A * 3/1993 Nakano ................. 252/299.01
5,515,045 A * 5/1996 Tak ............................. 341/23
5,900,599 A * 5/1999 Ohashi et al. .............. 200/5 A
6,007,738 A * 12/1999 Shimamoto et al. ... 252/299.01
6,010,642 A * 1/2000 Takatsu et al. .......... 252/299.6
6,195,085 B1 * 2/2001 Becker et al. .............. 345/163
6,319,963 B1 * 11/2001 Coates et al. ................ 428/1.1
6,322,875 B1 * 11/2001 Kimura ...................... 428/195

FOREIGN PATENT DOCUMENTS

JP 10-289633 * 10/1998 ................. 428/195
JP 11-176273 7/1999

* cited by examiner

*Primary Examiner*—Mark F. Huff
*Assistant Examiner*—Jennifer R. Sadula
(74) *Attorney, Agent, or Firm*—McGlew and Tuttle, P.C.

(57) ABSTRACT

A decorated key top presenting light transmitting rainbow-colored gloss and beautiful appearance giving a feeling of high quality, that can be produced at low cost through a continuous production process in which a liquid crystalline organic polymer layer (4) of cholesteric orientated liquid crystalline organic polymer is formed on the key top (10) surface and/or back.

15 Claims, 5 Drawing Sheets

Fig. 5
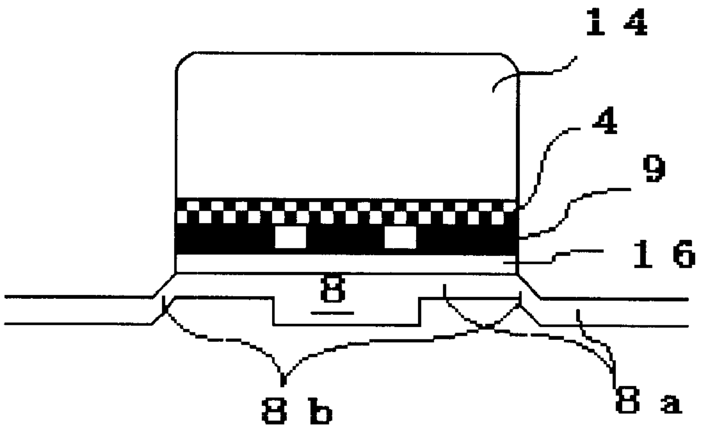
Fib. 6
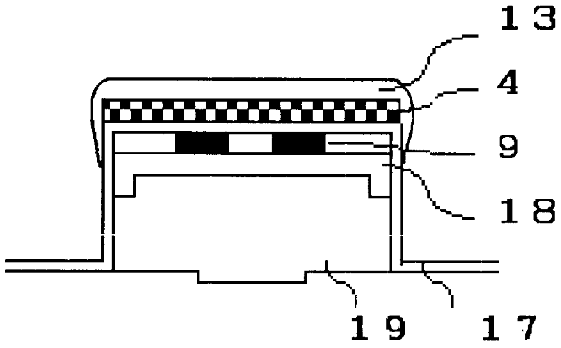

DECORATED KEY TOP AND MANUFACTURING METHOD THEREOF

TECHNICAL FIELD OF THE INVENTION

The present invention concerns a decorated key top of beautiful appearance giving a feeling of high quality that can be manufactured at low cost, such as push buttons, used for cellular phones, portable information terminals, remote controls for various home electric appliances, card remote controls and various keyboards.

PRIOR ART

As a method for decorating with metallic gloss or pearl gloss the key top portion as a push button, used for a conventional cellular phone, a portable information terminal, a remote control for various home electric appliances, a card remote control and various keyboards or the like, a molding method by blending resin or rubber composing the key top with metal powder or pearl pigment, a screen printing or spraying method of paint containing metal powder or pearl pigment, a metal film deposition method of aluminum, chrome, or the like by evaporation of metal plating, are known.

Moreover, recently, a key top of beautiful appearance giving a feeling of high quality, having light transparent rainbow-colored gloss is strongly demanded.

However, the molding method by blending resin or rubber composing the key top with metal powder or pearl pigment produces a striped pattern or uneven color tone due to powder segregation, as it is difficult to disperse powder uniformly, can not obtain an uniform gloss of good feel of material, causing problems from aesthetic point of view.

Also, the printing or spraying method of paint containing metal powder or pearl pigment could not obtain a decorated key top having an even rainbow-colored gloss of good feel of material.

Further, a key top wherein aluminum or chrome or other metal film is deposited by evaporation or metal plating presents an even metallic gloss, but is lacking the rainbow-colored gloss.

On the other hand, methods by the Applicant, described in Japanese Patent Laid-Open HEI 10-289633 and Japanese Patent Laid-Open HEI 11-176273, provide a decorated key top reflecting selectively light of a particular frequency and having a rainbow-colored gloss, by laminating, in any film thickness, films of inorganic matter such as titanium oxide, but they were inappropriate for mass production because of batch film deposition operation taking much processing time. Moreover, film deposition requires complicated jigs and provokes other problems. Further, as these methods use inorganic matter, compounding with the key top made of organic polymer material, often required various adulteration treatments, increasing labor and cost.

DETAILED DESCRIPTION OF THE INVENTION

The present invention provides a decorated key top having a selective reflection wavelength band in the visible light range, presenting a light transmitting rainbow-colored gloss and a beautiful appearance giving a feeling of high quality, that can be produced at low cost, by providing the key top surface and/or back with a cholesteric orientation liquid crystalline organic polymer layer, to solve said problem.

The selection of a liquid crystalline organic polymer layer wherein the reflective wavelength is visible light, violet, blue, green, yellow, red or other color tones can be obtained, and reflected light reinforcing wavelength allows the color tone to be controlled.

Namely, it is a decorated key top, wherein a liquid crystalline organic polymer layer having a selective reflection wavelength band in the visible light is formed on the key top surface and/or back.

Moreover, it is a decorated key top, wherein a liquid crystalline organic polymer layer having a selective reflection wavelength band in the visible light is formed, through a plastic film, on the key top surface and/or back.

Further, it is a decorated key top, wherein the liquid crystalline organic polymer layer is composed of cholesteric orientation liquid crystalline organic polymer. Moreover the invention relates to a manufacturing method of decorated a key top, wherein a liquid crystalline organic polymer layer having a selective reflection wavelength band in the visible light is formed on the surface and/or back of a key top molded by a die, or on the surface of a key top formed by dripping liquid resin on a base of polymer material, reacting and hardening the same, through application of crystalline organic polymer and then cholesteric orientation.

Further, the invention relates to a manufacturing method of a decorated key top, wherein a liquid crystalline organic polymer layer having a selective reflection wavelength band in the visible light is formed on the surface and/or back of a key top molded by a die, or on the surface of a key top formed by dripping liquid resin on a base of the polymer material, reacting and hardening the same, by gluing a plastic film having cholesteric orientated crystalline organic polymer layer.

Further, the invention relates to a manufacturing method of a decorated key top, wherein a liquid crystalline organic polymer layer having a selective reflection wavelength band in the visible light is formed on the surface and/or back of a key top molded by a die, or on the surface of a key top formed by dripping liquid resin on a base of polymer material, reacting and hardening the same, by placing a heat transfer sheet having cholesteric orientated crystalline organic polymer layer, and transferring the same by heat and pressure.

As the liquid crystalline organic polymer of the present invention, all of those that are in a crystal state at and beyond the glass transition point and in a glass state at and below the glass transition point can be used, and for example, backbone type liquid crystalline organic polymers such as polyester, polyamide, polyester amid, polycarbonate, polyester imide, polyether, polythiol or the like, polyacrylate base, polymethaacrylate base, polysiloxane base or polymalonate base side-chain type liquid crystalline organic, polymers, rod form stiff backbone type liquid crystalline organic polymers such as synthetic polypeptide, cellulose derivatives, polyisocyanate or the like, and their composite liquid crystalline organic polymers can be used.

The liquid crystalline organic polymer layer is required to be orientated in order to present a rainbow-colored gloss, and such orientation includes smectic orientation, nematic orientation, cholesteric orientation, discotic orientation, but cholesteric orientation and discotic orientation are preferable, and from the viewpoint of color, gloss, handling, or the like, cholesteric orientation is most preferable.

EMBODIMENT OF THE INVENTION

Now, the present invention will be described more in detail.

The liquid crystalline organic polymer layer of the present invention is preferably a multi-layer structure wherein layers of mono-domain having anisotropy in the molecular orientation are superposed continuously in a helical form. The central wavelength of light selectively reflected by the obtained decorated key top depends on the film thickness of a single layer. The film thickness of a single layer is preferably 50 nm 300 nm, and further, considering the optical selective reflection at the specific wavelength, the number of layers is preferably 5 to 50, and the total thickness is preferably 250 nm to 15000 nm. If the total thickness is less than 250 nm, the rainbow-colored gloss becomes pale, and if it exceeds 15000 nm, the translucency decreases disadvantageously.

In practice, though it is subjected to the nature, refractive index, shape of polymer material used for the key top and to the material, refractive index, color tone or the like of liquid crystal polymer, a total thickness range of 500 nm to 5000 nm presents a high optical selective reflection at tie specific wavelength. A beautiful key top presenting rainbow-colored gloss, mainly in red, yellow, blue or violet, that could not be obtained conventionally, can be obtained.

In addition, in order to recognize characters and symbols printed under the liquid crystalline organic polymer layer, it is undesirable that the total light beam transmittance of the liquid crystalline organic polymer layer is less than 70%, because the translucency becomes insufficient. The preferable total light beam transmissibility is equal or superior to 75%, and more preferably, equal or superior to 80%. Note that the total light beam transmittance used for the present invention is a value based on JIS (Japanese Industrial Standard) K7105.

The cholesteric orientation liquid crystalline organic polymer layer having its selective reflection wavelength band in the visible light can be prepared by known methods (1) to (4) described below. Especially, a liquid crystalline organic polymer layer having its selective reflection wavelength band in the visible light obtained by the methods (2) or (3) have a beautiful appearance, a good productivity and are, therefore, preferable.

(1) Method wherein low molecular liquid crystal is cholesteric oriented, and then cross-linked by optical reaction or thermal reaction or the like to fix the orientation.

(2) Method wherein side-chain type or backbone type thermotropic polymer liquid crystal is cholesteric orientated in liquid crystal state, and then cooled to a temperature equal or inferior to the liquid transition point, to fix the orientation state.

(3) Method wherein side-chain type or backbone type lyotropic polymer liquid crystal is cholesteric orientated in liquid crystal state, and then the orientation state is fixed by progressively removing medium.

(4) Cholesteric orientation liquid crystalline organic polymer obtained by the method (1) to (3) is ground to fine powder, blended with painting resin or printing ink or the like, to paint or print the same.

In order to form a liquid crystalline organic polymer layer on the recto/verso of a key top, liquid crystalline organic polymer is applied directly over the key top, or after having disposed base coat layer and exerting rubbing treatment or the like over the surface thereof, the cholesteric orientation structure is formed, and fixed without damaging the orientation in the liquid crystal state. This provides a decorated key top provided with liquid crystalline organic polymer layer.

On the other hand, in order to form a liquid crystalline organic polymer layer on a plastic film, the orientation function is afforded to the plastic film by rubbing treatment or the like, a liquid crystalline organic polymer is applied, and then the cholesteric orientation structure is formed, and fixed without damaging the orientation in the liquid crystal state. This provides a decorated key top provided with a liquid crystalline organic polymer layer, and thus a film wherein a cholesteric orientation liquid crystalline organic polymer layer is formed. A decorated key top provided with a liquid crystalline organic polymer layer is obtained by gluing this film to the key top.

Additionally, in order to form a liquid crystalline organic polymer layer on a heat transfer film, the orientation function is afforded by Tubbing treatment or the like to a thin plastic film on which a detachment layer is provided and further a protective layer is provided to smooth the surface thereof, liquid crystalline organic polymer is applied to this film, and then the cholesteric orientation structure is formed, and fixed without damaging the orientation in the liquid crystal state to form a cholesteric orientation liquid crystalline organic polymer layer, and further, a hot melt adhesive layer is applied thereto, to prepare a heat transfer sheet of liquid crystalline organic polymer layer. This heat transfer sheet is opposed to the surface and/or back of the key top, and transferred by applying beat and pressure by a known heat transfer method, to obtain a decorated key top provided with a liquid crystalline organic polymer layer. Here, a protective layer maybe disposed between the liquid crystalline organic polymer and the hot melt adhesive layer in order to protect the liquid crystalline organic polymer layer.

Concerning the method to afford the key top or film of the present invention with orientation function, in addition to the rubbing treatment, the orientation function can be afforded by using a known film or by rubbing directly in one direction with a piece of cloth. As for the method to apply liquid crystalline organic polymer, screen printing, tampo printing, photogravure, flexography, or other printing methods, or application, dipping, potting or the like may be used without special restriction.

Further, different reflective color tone points can be formed by varying selectively reflecting light wavelength through the orientation treatment under the different cooling conditions by scanning a desired point of the liquid crystalline organic polymer layer with YAG laser beam and heat melting the liquid crystalline organic polymer layer of that point, or it is possible to obtain a color tone wherein the specific wavelength selective reflectivity is cancelled partially or totally, by changing an an-isotropic layer of the oriented liquid crystal to an isotropic layer through the high power YAG laser beam scanning. Similarly, portions of any form such as characters, symbols or the like without cholesteric reflective color can be obtained by burning and removing desired points through the high power YAG laser beam scanning. The material of the key top of the present invention includes all key tops made of resin or rubber elastic element.

Though the composition, nature, elasticity or color tone of resins used for the key top are not specially specified, it is preferable that their translucency is good, and more particularly, poly methyl methacrylate, polyearbonate, silicone resin, amorphous polyester, PVC, polystyrene, polyacrylate, amorphous polyolefin, polymethylpentene, amorphous nylon, polyurethane, ester base thermoplastic elastomer, styrene base thermoplastic elastomer, nylon base thermoplastic elastomer are preferable.

Moreover, polyethylene, polypropylene, ABS resin, PET, PBT or other crystalline polyesters, crystalline nylon, polyphenylene ether, polyacetal, polysulfone, polyether sulfone, polyphenylene sulfide, polyimide, polyether, polyketone, polyether ketone, polyether ether ketone, polyether nitrile, polyether imide, crystal liquid polymer, fluorine resin or other semitransparent of slightly colored resins are also accepted. In addition, silicone resin, epoxy resin, phenol resin, unsaturated polyester, diallyl phthalate, acrylic base resin, urethane resin or other publicly known thermosetting, photo-curing, moisture curing, hygrosetting liquid resins can also be used.

Using these resins, the key top of the present invention is composed of a mechanical mold key top, or a key top whose surface is integrated with a resin film, or a key top hardened by dripping and reacting liquid resin, or the like.

The key top made of resin of the present invention may have a push-button structure by attaching by means of glue or double-faced tape to a key pad including an operation section and a non-operation section formed from synthetic rubbers such as silicone rubber or ethylenepropylene base rubber, that are rubber like elastic element, or thermoplastic elastomers.

Further, the key top made of rubber like elastic element of the present invention, is a key top formed of synthetic rubber or thermoplastic elastomer. Though the composition, nature, elasticity or color tone of rubber like element used for the key top are not specially specified, it is preferable that their translucency is good, and, for instance, synthetic rubbers include silicone rubber, ethylene propylene base rubber, urethane rubber or the like, while thermoplastic elastomers include styrene base, olefin base, urethane base, ester base and PVC base elastomers.

Besides, the present invention provides for the stabilization physically and chemically of the liquid crystalline organic polymer layer, by forming on the liquid crystalline organic polymer layer on the key top, a polymer protective layer of 5 $\mu$m to 60 $\mu$m in thickness, by laminating and hardening non hardened liquid resin.

Though the nature, application and hardening method of liquid resin are not specified, a polymer protective layer of 5 $\mu$m to 60 $\mu$m can be formed, by using thermosetting type, photo-curing type or moisture curing type acrylic base, urethane base, silicone base, epoxy base, ester base or other monomer or oligomer, and laminating and hardening by application, various printing, potting or other method. If the film thickness is less than 5 $\mu$m, the mechanical characteristics of the polymer protective layer is week and unable to protect sufficiently, and, on the other hand, if it is superior to 60 $\mu$m, the clearness of the rainbow-colored gloss is weakened, deteriorating its beautiful appearance. More preferably, the thickness of the polymer protective film is in the range of 10 $\mu$m to 40 $\mu$m. In addition, a plurality of polymer protective films can be laminated.

This polymer protective layer may be colorless and transparent, the use of those colored in red, blue or yellow and translucent can further create the color tone variation of the liquid crystalline organic polymer layer.

The key top manufacturing method of the present invention includes key tops formed by filling a cavity, using a dies of desired key top shape, with heat melted thermoplastic or liquid non hardened resin by injection molding, compression molding, transfer molding, rotation molding or the like and hardening the same, or key tops formed into a key top shape by printing character, symbol or the like on a resin film, placing the same in a mold cavity, and injecting heat melted resin into the cavity, or key tops molded by applying non hardened liquid resin on a key pad made of rubber like elastic element, or on a polyester, polyamide, polyurethane or other films or a substrate made of sheet polymer material and hardening.

The method of applying a liquid resin, potting system, dispenser system, pad printing system or other transfer system, dipping system, or the like is further described herein.

BRIEF DESCRIPTION OF DRAWINGS

FIG. 5 is a longitudinal cross-section showing a pushbutton switch disposed with a decorated key top of an Embodiment 4.

FIG. 6 is a longitudinal cross-section showing a decorated key top of an Embodiment 5.

DESCRIPTION OF THE PREFERRED EMBODIMENTS

Now, the present invention will be described more in detail referring to Embodiments and Comparative Example; however, the present invention is not limited by the following Embodiments.

EMBODIMENT 1

Figure 1:
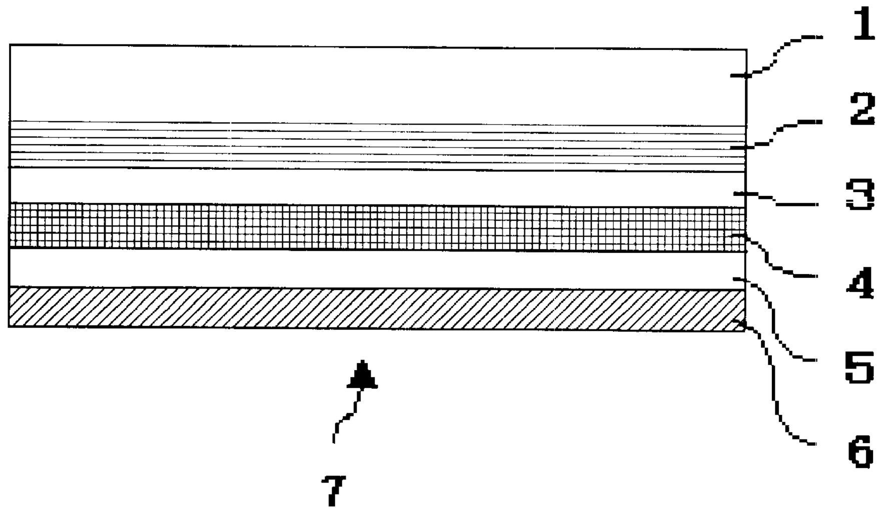
FIG. 1 is a longitudinal cross-section showing a heat transfer sheet wherein a liquid crystalline organic polymer layer of an Embodiment 1 is formed.

FIG. 1 is a longitudinal cross-section showing a heat transfer sheet wherein a liquid crystalline organic polymer layer of an Embodiment 1 is formed.

Figure 9:
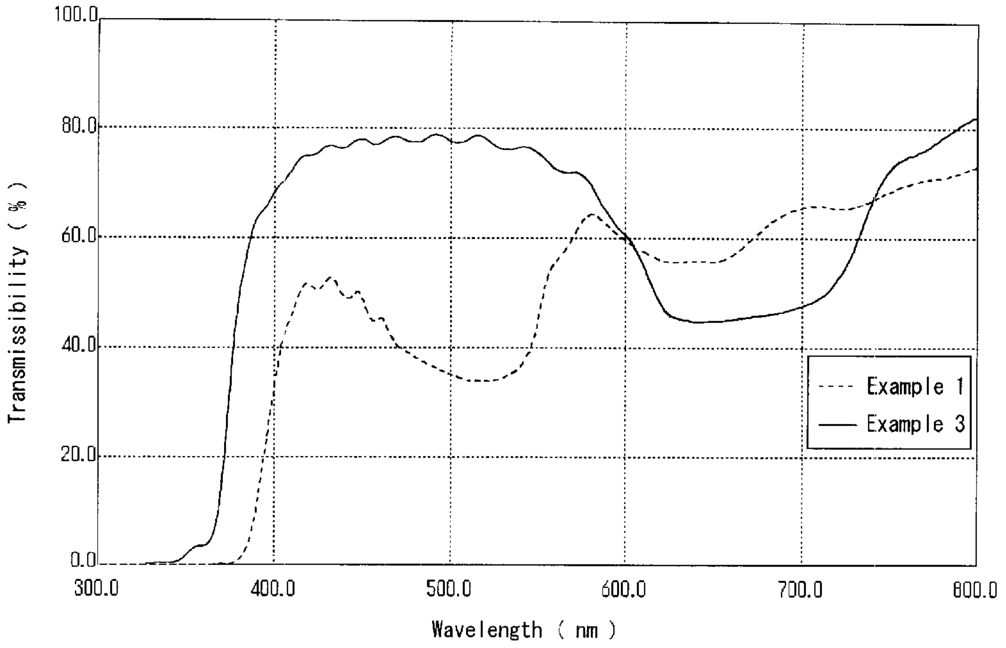
FIG. 9 is an optical spectrum of the Embodiment 1 and Embodiment 3.

A peel ply 2 is formed on a PET film 1 of 20 $\mu$m in thickness by photogravure roll printing silicone mold-release ink 0.5 $\mu$m thick, and then acrylic paint is applied to form a protective layer 3. Further, rubbing treatment is exerted onto the surface of this protective layer. 8 wt % tetrachloroethane solution of liquid crystalline organic polymer (base polymer inherent viscosity 0.12, Tg=75 degree C.), blended composition shown by the formula (1) is prepared. This solution is photogravure roll printed onto the rubbing treated protective layer surface, dried, then heat treated at 150 degree C. for 10 min and then fixed by cooling for cholesteric orientation, to obtain a liquid crystalline organic polymer layer 4 of 2 $\mu$m in thickness, reflecting greenlight. Further, acrylic base paint is applied to form a protective layer 5, then a hot melt adhesive layer 6 is formed to obtain a heat transfer sheet 7 having a liquid crystalline organic polymer layer. The optical spectrum in the visible range of the beat transfer sheet obtained by this Embodiment is shown in FIG. 9 by the broken line.

Formula 1

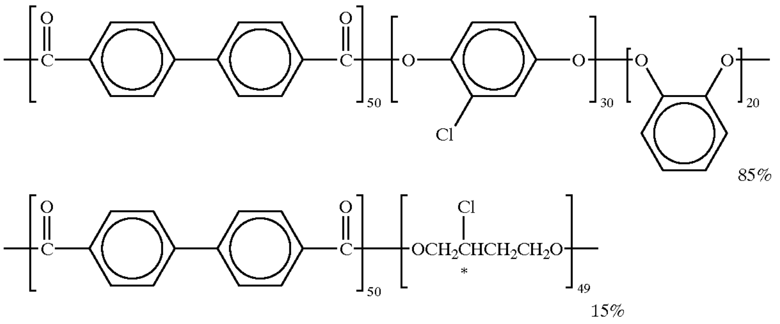

Figure 2:
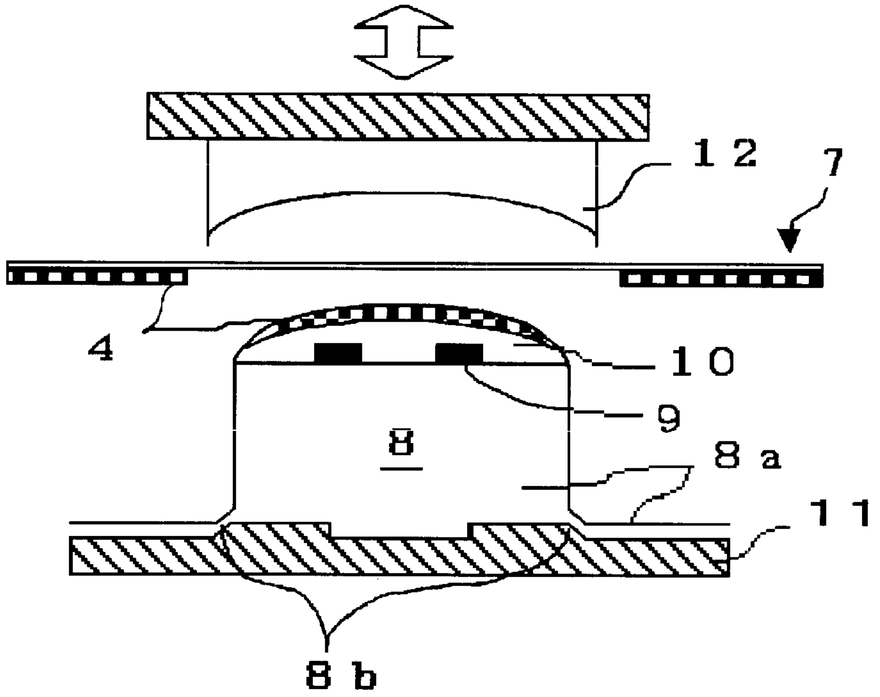
FIG. 2 is a longitudinal cross-section showing a pushbutton switch having a decorated key top wherein the liquid crystalline organic polymer layer of the Embodiment 1 is heat transferred.

FIG. 2 is a cross-section showing a pushbutton switch having a decorated key top made of translucent resin of this Embodiment, and a method for heat transferring the liquid crystalline organic polymer layer.

A key pad 8 comprises a non-operation section 8*a* and an operation section 8*b* formed from transparent silicone rubber, and a top surface provided with predetermined character symbol print layer 9 made by screen printing. This top surface is irradiated with short wavelength ultraviolet rays, treated with silane coupling agent, and then acrylic base UV setting resin is dripped and set by UV irradiation, to obtain a push-button switch having a key top 10 made of transparent acrylic resin. This push-button is fixed to a fixing jig 11 and the heat transfer sheet 7 is disposed in a way to be opposed. This heat transfer sheet 7 is compressed 2 sec. by a key top shaped stamp made of silicone rubber 12 heated to 110 for transferring the liquid crystalline organic polymer layer 4 and obtaining a decorated key top. As the thus obtained decorated key top is translucent, the character symbol print section under the key top can be viewed and it has a rainbow-colored gloss reflecting in green and presenting a beautiful appearance.

EMBODIMENT 2

Figure 3:
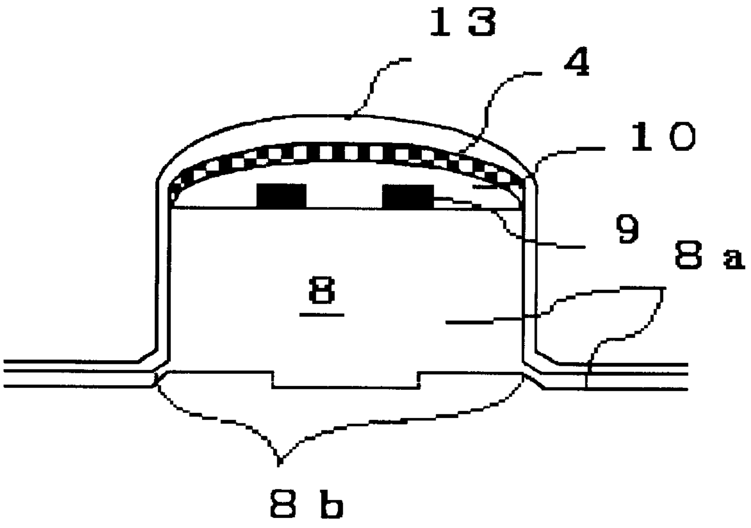
FIG. 3 is a longitudinal cross-section showing a pushbutton switch disposed with a decorated key top of an Embodiment 2.

FIG. 3 shows a cross-section of a pushbutton switch provided with a decorated key top of this Embodiment.

UV setting type acrylic base painting (HO2777U Fujikura Kasei Co., Ltd.) is applied to the push-button having the decorated key top having the rainbow-colored color by the liquid crystalline organic polymer layer prepared in the Embodiment 1, dried and set for laminating a polymer protective layer 13 of 15 $\mu$m in film thickness. This polymer protective layer allowed to protect and stabilize physically and chemically the transferred liquid crystalline organic polymer layer.

EMBODIMENT 3

Figure 4:
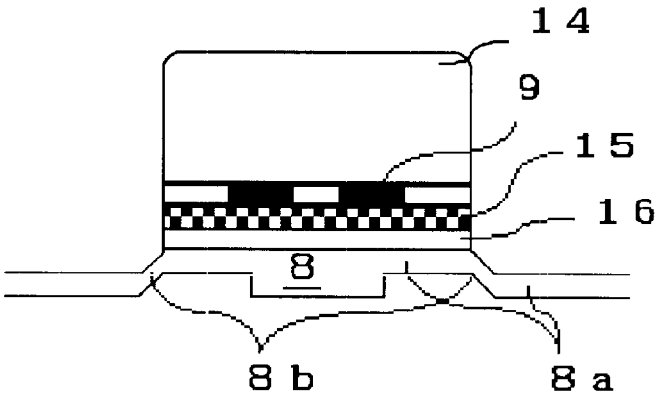
FIG. 4 is a longitudinal cross-section showing a pushbutton switch disposed with a decorated key top of an Embodiment 3.

FIG. 4 shows a cross-section of a pushbutton switch provided with a decorated key top of this Embodiment.

The non-operation section 8*a* and the operation section 8*b* of the key pad 8 are formed from transparent silicone rubber as in the Embodiment 1. The key top 13 is injection molded with polycarbonate resin (Panlite L1225L, Teijin Ltd.). The back of this key top is provided with a character symbol print layer 9 made by screen printing, and then a cholesteric orientation film 15 (TS-9087-02 Nippon Petrochemicals Co., Ltd.) is glued with UV setting glue to form a liquid crystalline organic polymer layer. The key top provided with this liquid crystalline organic polymer layer is put on said key pad 8 using adhesive 16, to obtain a push-button provided with a decorated key top, excellent in character and symbol recognition and presenting a rainbow-colored gloss reflecting in red.

The optical spectrum in the visible range of the one wherein a cholesteric orientation film (TS-9087-02 Nippon Petrochemicals Co., Ltd.) is glued with adhesive onto a polycarbonate plate is shown in FIG. 9 by the solid line.

EMBODIMENT 4

FIG. 5 is a longitudinal cross-section showing a pushbutton switch having a decorated A key top 14 of polycarbonate resin is injection molded and further, rubbing treatment is exerted onto the back of this key top, then 25 wt % N-methyl-pyrrolidone solution of optical active a liquid crystalline organic polymer (base polymer inherent viscosity 0.14, Tg=84 degree C.) expressed by the formula (2) is applied by screen printing, dried and then heat treated at 190 degree C. for 30 min and then fixed by cooling for cholesteric orientation, to obtain a liquid crystalline organic polymer layer 4 of 6 $\mu$m in thickness, reflecting dark red light. Further, outline character print layer 9 is proved by screen printing, and adhesive 16 is applied to this character print layer, a key pad 8 formed with translucent silicone rubber is glued, to obtain a decorated key top, presenting a rainbow-colored color reflecting in dark red.

As thus obtained decorated key top is translucent, the character symbol print section under the key top can be recognized.

Formula 2

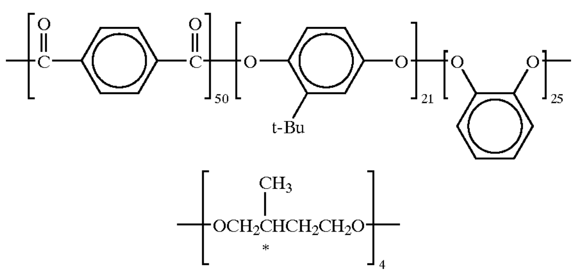

EMBODIMENT 5

FIG. 6 is a cross-section of the decorated key top of this Embodiment.

The surface of an alloy film 17 (Bayfol made by Bayer) of polycarbonate and polybutylene terephthalate, 100 $\mu$m thick, is corona treated, and a character symbol print layer 9 is provided by screen printing. The deformation of the indication section is restricted by urethane ink on this print layer, and a protective layer 18 is printed serving, at the same time, to improve the adhesion during the integral formation. This film 17 is drawn by a compression molding dies to deform it into a predetermined key top shape. This drawn film is pinched by an injection molding machine and polycarbonate resin 19 is injection molded to obtain a key top integrally formed with the film.

The heat transfer sheet 7 having a liquid crystalline organic polymer layer 4 prepared as in the Embodiment 1 is disposed opposite to thus obtained top surface, compressed 2 sec by a key top shaped stamp made of silicone rubber 12 heated to 110 degree C. for transferring the liquid crystalline organic polymer layer 4, arid further UV setting type acrylic base painting (1402777U fujikura Kasei Co., Ltd.) is applied, dried and set for laminating a polymer protective layer 13 of 15 $\mu$m in film thickness to obtain a decorated key top, excellent in character and symbol recognition, presenting a rainbow-colored color reflecting in green.

Moreover, the polymer protective layer allowed to protect and stabilize physically and chemically the transferred liquid crystalline organic polymer layer

EMBODIMENT 6

Figure 7:
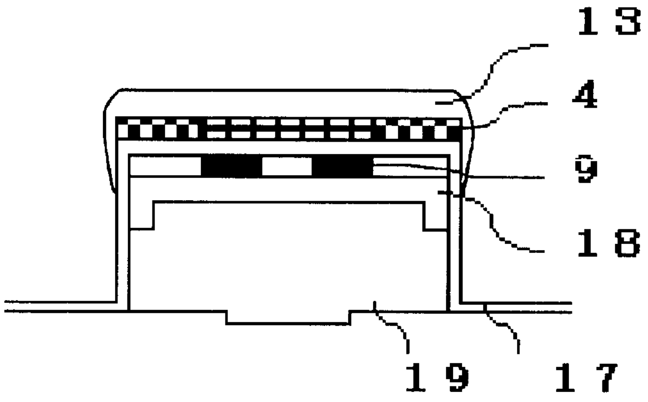
FIG. 7 is a longitudinal cross-section showing a decorated key top of an Embodiment 6.

FIG. 7 shows a cross-section of a decorated key top of this Embodiment.

The surface of an alloy film 17 (Bayfol made by Bayer) of polycarbonate and polybutylene terephthalate, 100 $\mu$m thick, is corona treated, and a character symbol print layer 9 is provided by screen printing. The deformation of the indication section is restricted by urethane ink on this print layer, and a protective layer 18 is printed serving, at the same time, to improve the adhesion during the integral formation. This film 17 is drawn by a compression molding dies to deform it into a predetermined key top shape. This drawn film is pinched by an injection molding machine and polycarbonate resin 19 is injection molded to obtain a key top integrally formed with the film.

The heat transfer sheet 7 having a liquid crystalline organic polymer layer 4 prepared as in the Embodiment 1 is disposed opposite to thus obtained top surface, compressed 2 sec by a key top shaped stamp made of silicone rubber 12 heated to 110 degree C. for transferring the liquid crystalline organic polymer layer 4, to obtain a key top.

Further, desired points of liquid crystalline organic polymer layer are scanned by a YAG laser beam to heat melt the liquid crystalline organic polymer layer of these points for varying selectively scattered light wavelength, and points presenting a rainbow-colored reflecting in light yellow are formed.

And further, a UV setting type acrylic base paint (H02777U Fujikura Kasei Co., Ltd.) is applied, dried and set for laminating a polymer protective layer 13 of 15 $\mu$m in film thickness, to obtain a decorated key top, excellent in character and symbol recognition, presenting a rainbow-colored color reflecting in green or partially in light yellow. This polymer protective layer allowed to protect and stabilize physically and chemically the transferred liquid crystalline organic polymer layer.

EMBODIMENT 7

Figure 8:
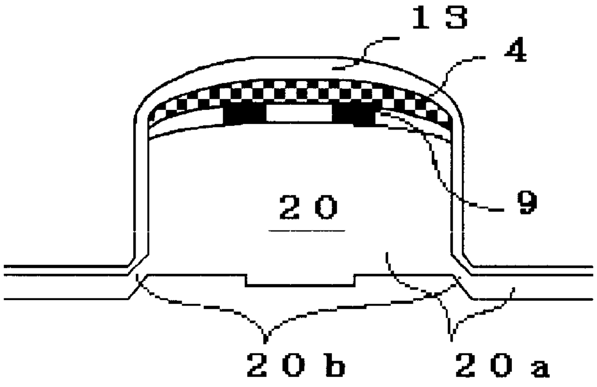
FIG. 8 is a longitudinal cross-section showing a decorated key top of an Embodiment 7.

FIG. 8 shows a cross-section of a decorated key top of this Embodiment.

A key top 20 having a non-operation section **20*a* and an operation section 20*b* are formed from transparent silicone rubber, and the top surface is provided with a character symbol paint layer 9 made by screen printing. Further, a rubbing treatment is exerted onto the surface of this protective layer. 8 wt % tetracloroetane solution of liquid crystalline organic polymer (base polymer inherent viscosity 0.12, Tg=75 degree C.), blended composition shown by the formula (1), used in the Embodiment 1, is screen printed onto the rubbing treated surface, dried, then heat treated at 150 degree C. for 10 min and then fixed by cooling for cholesteric orientation, to obtain a liquid crystalline organic polymer layer 4 of 21 $\mu$m in thickness, reflecting green light, Further, an acrylic base paint (H2777U, Fujikura Kasei Co., Ltd.) is applied for laminating a polymer protective layer 13**, 15 $\mu$m in film thickness, to obtain a decorated key top, excellent in character and symbol recognition and presenting a rainbow colored color reflecting in green. This polymer protective layer allowed to protect and stabilize physically and chemically the transferred liquid crystalline organic polymer layer.

COMPARATIVE EXAMPLE 1

A peel ply is formed on a PET film 1 of 20 $\mu$m in thickness by applying silicone mold-release ink 0.51 $\mu$m thick, and then acrylic paint is applied and dried to form a protective layer. A part of this protective layer is cut with a YAG laser to make a decorated layer to obtain a hologram decoration effect. Thereon, an inorganic thin film layer of 800 nm thick is formed from aluminum of 10% in total light transmissibility by a vapor deposition method. Further, an acrylic base hot melt adhesive is printed and formed. This heat transfer sheet is heat transferred on the surface of a key top made of transparent acrylic resin, but the key top of the obtained push-button is less translucent and deprived of rainbow-colored gloss.

COMPARATIVE EXAMPLE 2

A peel ply is formed on a PET film 1 of 20 $\mu$m in thickness by applying silicone mold-release ink 0.5 $\mu$m thick, and then acrylic paint is applied and dried to form a protective layer. Thereon, an inorganic thin film layer of 800 nm thick is formed from aluminum of 10% in total light transmissibility by a vapor deposition method. Further, acrylic base hot melt adhesive is printed and formed. This heat transfer sheet is heat transferred on the surface of a key top made of transparent acrylic resin, but the key top of the obtained push-button is less translucent and deprived of a rainbow-colored gloss.

Effect of the Invention

The present invention provides a decorated key top having a selective reflection wavelength band in the visible light, presenting light transmitting rainbow-colored gloss and beautiful appearance giving a feeling of high quality, wherein, the color tone can be controlled by frequencies reinforcing each other by reflected light, that can be produced at low cost through a continuous production process, by proving the key top surface and/or back with cholesteric orientation liquid crystalline organic polymer layer, and that could not be obtained by painting, printing ink, or metal plating, vapor deposition or the like.

Besides, as the obtained key top is translucent, character and symbol print section or back light disposed in the under layer can be viewed well.

What is claimed is:

1. A decorative key top, comprising a key top part and a translucent liquid crystalline organic polymer layer having a selective reflection wavelength band in a visible light range and a total light bean transmittance of 75% or more, said translucent liquid crystalline organic polymer layer being formed on a surface or a back side of the key top part, said translucent liquid crystalline organic polymer layer being composed of cholesteric orientation liquid crystalline organic polymer and said key top part having a printed character, the total light beam transmittance of said translucent liquid crystalline organic polymer layer being equal or superior to 75%.

2. The decorative key top according to claim 1, wherein the translucent liquid crystalline organic polymer layer is composed of a multi-layer structure in which from 5 to 50 layers of mono-domain structure, each of said layers having a thickness of from 50 nm to 300 nm, are superposed continuously in a helical form.

3. The decorative key top according to claim 1, wherein portions having different reflective colors are formed in the translucent liquid crystalline organic polymer layer by scanning said translucent liquid crystalline organic polymer layer with a laser beam to heat-melt and carrying out an orientation treatment under different cooling conditions.

4. A manufacturing method for manufacturing a decorated key top having a key top part and a translucent liquid crystalline organic polymer layer having a selective reflection wavelength band in a visible light range and a total light beam transmittance of 75% or more on a surface or a back side of the key top part which is molded using a die, said translucent liquid crystalline organic polymer layer being composed of cholesteric orientation liquid crystalline organic polymer and said key top part having a printed character, the method comprising the steps of:

dripping a liquid resin on a base of polymer material;

treating the liquid resin with a reaction hardener; and forming the translucent liquid crystalline organic polymer layer by applying a crystalline organic polymer to the key top and orienting the crystalline organic polymer in a cholesteric order, the total light beam transmittance of said translucent liquid crystalline organic polymer layer being equal or superior to 75%.

5. The manufacturing method of decorated key top according to claim 4, wherein the translucent liquid crystalline organic polymer layer is composed of a multi-layer structure in which from 5 to 50 layers of mono-domain structure, each of said layers having a thickness of from 50 nm to 300 nm, are superposed continuously in a helical form.

6. The manufacturing method of a decorated key top according to claim 4, wherein portions having different reflective colors are formed in the translucent liquid crystalline organic polymer layer by scanning said translucent liquid crystalline organic polymer layer with a laser beam for heat-melting and carrying out an orientation treatment under different cooling conditions.

7. A manufacturing method of a decorated key top having a key top part and a translucent liquid crystalline organic polymer layer having a selective reflection wavelength band in a visible light range and a total light beam transmittance of 75% or more on a surface or a back side of the key top part which is molded with a die, said translucent liquid crystalline organic polymer layer being composed of cholesteric orientation liquid crystalline organic polymer, the total light beam transmittance of said translucent liquid crystalline organic polymer layer being equal or superior to 75% and said key top part having a printed character, the method comprising the steps of:

dripping a liquid resin on a base of polymer material;

treating the liquid resin with reaction hardener; and gluing a plastic film having a cholesteric oriented crystalline organic polymer layer to form a layer to the key top.

8. The manufacturing method of decorated key top according to claim 7, wherein the translucent liquid crystalline organic polymer layer is composed of a multi-layer structure in which from 5 to 50 layers of mono-domain structure, each of said layers having a thickness of from 50 nm to 300 nm, are superposed continuously in a helical form.

9. The manufacturing method of a decorated key top according to claim 7, wherein portions having different reflective colors are formed in the translucent liquid crystalline organic polymer layer by scanning said translucent liquid crystalline organic polymer layer with a laser beam for heat-melting and carrying out an orientation treatment under different cooling conditions.

10. A manufacturing method of a decorated key top having a key top part and a translucent liquid crystalline organic polymer layer having a selective reflection wavelength band in the visible light range and a total light beam transmittance of 75% or more on a surface or a back side of the key top part which is molded with a die, said translucent liquid crystalline organic polymer layer being composed of cholesteric orientation liquid crystalline organic polymer and said key top part having a printed character, the method comprising the steps of:

dripping a liquid resin on a base of polymer material;

treating the liquid resin with reaction hardener to react and harden said liquid resin; and forming said translucent liquid crystalline organic polymer layer by placing a heat transfer sheet having a cholesteric oriented crystalline organic polymer layer on the base and transferring the cholesteric oriented crystalline organic polymer layer to the base by heat and pressure, the total light beam transmittance of said translucent liquid crystalline organic polymer layer being equal or superior to 75%.

11. The manufacturing method of decorated key top according to claim 10, wherein the translucent liquid crystalline organic polymer layer is composed of a multi-layer structure in which from 5 to 50 layers of mono-domain structure, each of said layers having a thickness of from 50 nm to 300 nm, are superposed continuously in a helical form.

12. The manufacturing method of a decorated key top according to claim 10, wherein portions having different reflective colors are formed in the translucent liquid crystalline organic polymer layer by scanning said translucent liquid crystalline organic polymer layer with a laser beam for heat-melting and carrying out an orientation treatment under different cooling conditions.

13. A decorative key top comprising:

a key top;

a print layer on said key top body;

a liquid crystalline organic polymer layer on said print layer, said liquid crystalline organic polymer layer having a selective reflection wavelength band in a visible light range and a total light beam transmittance of 75% or more, said liquid crystalline organic polymer layer being composed of a cholesteric orientation liquid crystalline organic polymer.

14. A key top in accordance with claim 13, further comprising:

isotropic portions arranged on said key top body surrounded by said liquid crystalline organic polymer layer.

15. A key top in accordance with claim 14, wherein:

said isotropic portions are formed in said liquid crystalline organic polymer layer by scanning said liquid crystalline organic polymer layer with a laser beam.

* * * * *